(12) United States Patent
Tomita

(10) Patent No.: US 8,881,201 B2
(45) Date of Patent: Nov. 4, 2014

(54) METHODS AND SYSTEMS FOR PROVIDING MEDIA CONTENT LISTINGS BY CONTENT PROVIDER

(75) Inventor: Kanako Tomita, Tokyo (JP)

(73) Assignee: United Video Properties, Inc., Santa Clara, CA (US)

( * ) Notice: Subject to any disclaimer, the term of this patent is extended or adjusted under 35 U.S.C. 154(b) by 397 days.

(21) Appl. No.: 12/779,797

(22) Filed: May 13, 2010

(65) Prior Publication Data

US 2011/0283325 A1 Nov. 17, 2011

(51) Int. Cl.
*G06F 3/00* (2006.01)
*H04N 21/41* (2011.01)
*H04N 5/445* (2011.01)
*H04N 21/482* (2011.01)

(52) U.S. Cl.
CPC ....... *H04N 21/4126* (2013.01); *H04N 5/44543* (2013.01); *H04N 21/4821* (2013.01)
USPC .................. 725/61; 725/39; 725/59

(58) Field of Classification Search
None
See application file for complete search history.

(56) References Cited

U.S. PATENT DOCUMENTS

| | | | | |
|---|---|---|---|---|
| 2003/0149988 | A1* | 8/2003 | Ellis et al. | 725/87 |
| 2008/0005766 | A1* | 1/2008 | Ostrowska et al. | 725/53 |
| 2009/0125940 | A1* | 5/2009 | Kim et al. | 725/39 |
| 2010/0262994 | A1* | 10/2010 | Kawano et al. | 725/39 |

* cited by examiner

*Primary Examiner* — Brian T Pendleton
*Assistant Examiner* — Jean D Saint Cyr
(74) *Attorney, Agent, or Firm* — Ropes & Gray LLP

(57) ABSTRACT

An interactive television program guide method and system is provided in which a viewer may direct a media guidance application to display program listings independent of scheduled broadcast time. Selectable options are presented to viewer on the screen, allowing the user to select a subset of content providers and view associated listings. The media guidance application removes duplicate listings from the listings display, in accordance with the viewer's preference. Listings may be displayed in a variety of arrangements, including alphabetical order by title, by genre, or by day scheduled for broadcast. Listings can also be sorted according to several criteria and displayed for further convenience to the viewer. The viewer may specify a broadcast time interval to further narrow the subset of listings that are displayed. Additional options displayed on the screen allow the viewer to re-sort listings on the display screen.

24 Claims, 9 Drawing Sheets

METHODS AND SYSTEMS FOR PROVIDING MEDIA CONTENT LISTINGS BY CONTENT PROVIDER

BACKGROUND OF THE INVENTION

This invention relates to media content applications, and more particularly this invention relates to media guidance applications that display media content listings associated with content providers.

The amount of media and information available to users in any given media delivery system can be substantial. Media guidance applications provide a tool that allows users to effectively navigate media selections and easily identify media that they may desire. Media guidance applications typically provide some type of display of listings information to assist the user in selecting content for viewing.

Conventional television program guides display programming listings arranged by time of broadcast. A need presents itself to assist the user in locating media content in instances when listing by broadcast time schedule is not convenient. For example, the user may not remember the title of a particular program or when it is scheduled for broadcast. Content listings arranged by additional criteria, such as by title, by genre, or by date of broadcast allow the user additional navigational tools. It is therefore an object of the present invention to provide a way in which the user can select additional display options to improve navigation among content listings.

SUMMARY OF THE PRESENT INVENTION

The present invention provides systems and methods for providing a television viewer with display options for media content listings. This media content includes conventional television programming, as well as pay-per-view programs, on-demand programs, Internet content, and other types of media or video content. Media content can be in the form of text, audio, still images, animation, video, and interactivity content. A media guidance application in accordance with the present invention allows users to navigate among content including video clips, articles, advertisements, chat sessions, games, etc. The media guidance application may also contain program guide listings.

The media guidance application allows the user to select options on the display that allow media content listings for only one (or a subset of all) content providers to be displayed. Content listings may be arranged in alphabetical order, according to genre, or both across multiple scheduled broadcast times, with no duplicate listings displayed. The display may exclude broadcast schedule time information, and need not be arranged by scheduled broadcast time. In addition to allowing the user to view media content listings, the media guidance application may allow the user to interact with the media guidance application via on-screen options. These options may be directed to limiting the number of displayed listings, arranging the displayed listings in a user-selected order, allowing for more convenient navigation among listings, or any combination thereof. The media guidance application may also arrange listings according to more than one sorting criteria. The media guidance application may remove duplicate listings (e.g., by program or by episode) from the display if a program or a particular episode of a program is scheduled for broadcast more than once by the selected content provider.

Titles of the content listings display may be arranged in a grid format or columnar list. Additional columnar lists may adjoin the title list, and display information related to each program listing, such as genre type, scheduled date of broadcast, or other suitable descriptive information. All or some of the listings information may also include graphical information such as a still screenshot image, promotional image, trademark, logo, icon or other graphic indicator associated with the respective program, to aid navigation of the listings. The media guidance application may also display detailed listings information in response to a user command, such as manipulation of a highlight region.

The media guidance application may allow a contiguous or non-contiguous time interval to be specified by the user, such that only listings of media content scheduled to be broadcast during this interval are displayed. Duplicate listings scheduled for broadcast within this time interval may be excluded from the display.

DETAILED DESCRIPTION OF THE EMBODIMENTS

Figure 1:
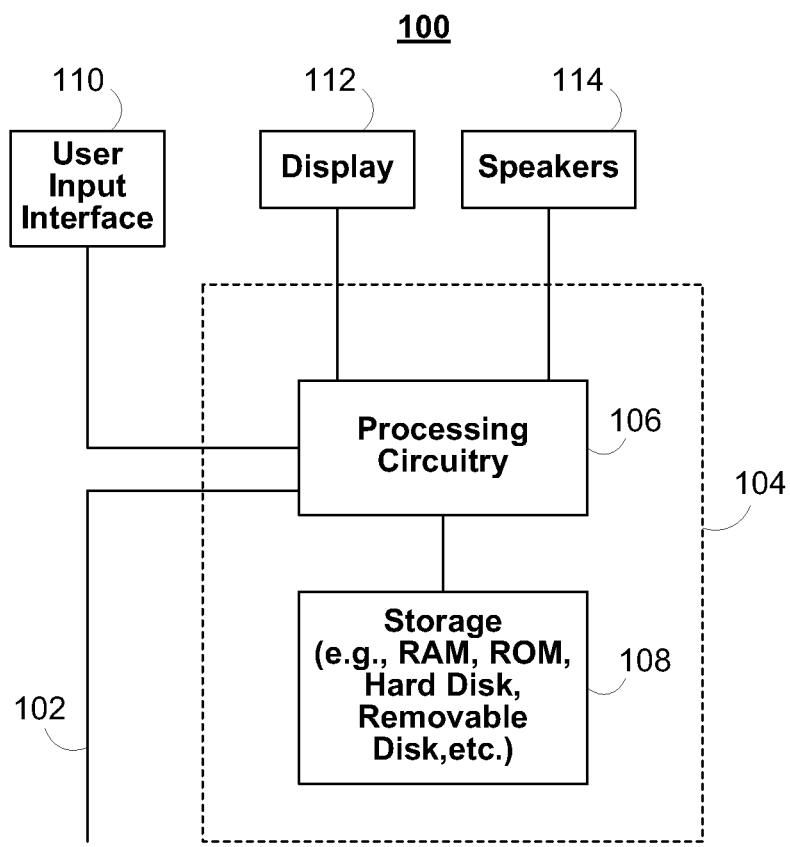
FIG. 1 is a block diagram of an illustrative user equipment device in accordance with some embodiments of the present invention.

The amount of media available to users in any given media delivery system can be substantial. Detailed information associated with available media can also be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (IPGs), sometimes referred to as electronic program guides (EPGs), are well-known guidance applications that, among other things, allow users to navigate among and locate many types of media content. This media content includes conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Users may access media content and the media guidance application (and its display screens described above and below) from one or more of their user equipment devices. FIG. 1 shows a generalized embodiment of illustrative user equipment device 100. More specific implementations of user equipment devices are discussed below in connection with FIG. 2. User equipment device 100 may receive media content and data via input/output (hereinafter "I/O") path 102. I/O path 102 may provide media content (e.g., broadcast programming, on-demand programming, Internet content, and other video or audio) and data to control circuitry 104, which includes processing circuitry 106 and storage 108. Control circuitry 104 may be located in whole or part within a user device, or may be distributed among one or more distribution facilities and one or more user devices. Control circuitry 104 may also be implemented entirely within one or more distribution facilities. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry 106 such as processing circuitry based on one or more microprocessors, microcontrollers, digital signal processors, programmable logic devices, etc. In some embodiments, control circuitry 104 executes instructions for a media guidance application stored in memory (i.e., storage 108). In client-server based embodiments, control circuitry 104 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 108 that is part of control circuitry 104. Storage 108 may include one or more of the above types of storage devices. For example, user equipment device 100 may include a hard drive for a DVR (sometimes called a personal video recorder, or PVR) and a DVD recorder as a secondary storage device. Storage 108 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 104 may also include scaler circuitry for upconverting and downconverting media into the preferred output format of the user equipment 100. Circuitry 104 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 108 is provided as a separate device from user equipment 100, the tuning and encoding circuitry (including multiple tuners) may be associated with storage 108.

A user may control the control circuitry 304 using user input interface 110. User input interface 110 may be any suitable user interface, such as a remote control, mouse, trackball, keypad, keyboard, touch screen, touch pad, stylus input, joystick, voice recognition interface, or other user input interfaces. Display 112 may be provided as a stand-alone device or integrated with other elements of user equipment device 100. Display 112 may be one or more of a monitor, a television, a liquid crystal display (LCD) for a mobile device, or any other suitable equipment for displaying visual images. In some embodiments, display 112 may be HDTV-capable. Speakers 114 may be provided as integrated with other elements of user equipment device 100 or may be stand-alone units. The audio component of videos and other media content displayed on display 112 may be played through speakers 114. In some embodiments, the audio may be distributed to a receiver (not shown), which processes and outputs the audio via speakers 114.

The guidance application may be implemented using any suitable architecture. For example, it may be a stand-alone application wholly implemented on user equipment device 100. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 100 is retrieved on-demand by issuing requests to a server remote to the user equipment device 100. In one example of a client-server based guidance application, control circuitry 104 runs a web browser that interprets web pages provided by a remote server.

In yet other embodiments, the media guidance application is downloaded and interpreted or otherwise run by an interpreter or virtual machine (run by control circuitry 104). In some embodiments, the guidance application may be encoded in the ETV Binary Interchange Format (EBIF), received by control circuitry 104 as part of a suitable feed, and interpreted by a user agent running on control circuitry 104. For example, the guidance application may be a EBIF widget. In other embodiments, the guidance application may be defined by a series of JAVA-based files that are received and run by a local virtual machine or other suitable middleware executed by control circuitry 104. In some of such embodiments (e.g., those employing MPEG-2 or other digital media encoding schemes), the guidance application may be, for example, encoded and transmitted in an MPEG-2 object carousel with the MPEG audio and video packets of a program.

Figure 2:
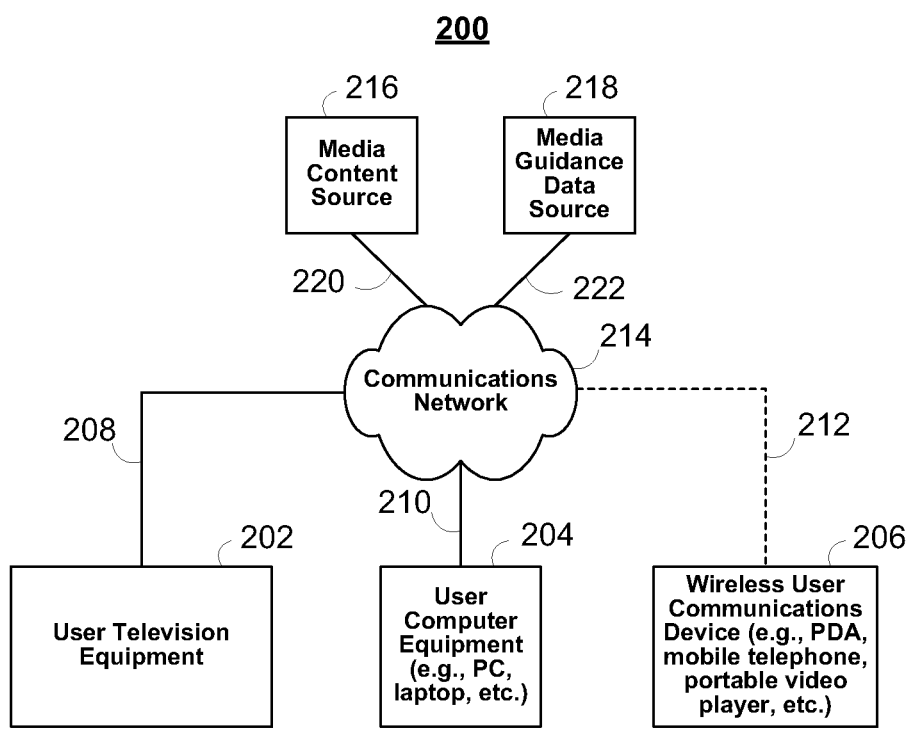
FIG. 2 is a block diagram of an illustrative media communications system in accordance with some embodiments of the present invention.

User equipment device 100 of FIG. 1 can be implemented in system 200 of FIG. 2 as user television equipment 202, user computer equipment 204, wireless user communications device 206, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 202 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 204 may include a PC, a laptop, a tablet, a WebTV box, a personal computer television (PC/TV), a PC media server, a PC media center, or other user computer equipment. WEBTV is a trademark owned by Microsoft Corp. Wireless user communications device 206 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 202, user computer equipment 204, and wireless user communications device 206 may utilize at least some of the system features described above in connection with FIG. 1 and, as a result, include flexibility with respect to the type of media content available on the device. For example, user television equipment 202 may be Internet-enabled allowing for access to Internet content, while user computer equipment 204 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 200, there is typically more than one of each type of user equipment device but only one of each is shown in FIG. 2 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 214. Namely, user television equipment 202, user computer equipment 204, and wireless user communications device 206 are coupled to communications network 214 via communications paths 208, 210, and 212, respectively. Communications network 214 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 208, 210, and 212 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 212 is drawn with dotted lines to indicate that in the exemplary embodiment shown in FIG. 2 it is a wireless path and paths 208 and 210 are drawn as solid lines to indicate they are wired paths (although these paths may be wireless paths, if desired). Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths, such as those described above in connection with paths 208, 210, and 212, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes media content source 216 and media guidance data source 218 coupled to communications network 214 via communication paths 220 and 222, respectively. Paths 220 and 222 may include any of the communication paths described above in connection with paths 208, 210, and 212. Communications with the media content source 216 and media guidance data source 218 may be exchanged over one or more communications paths, but are shown as a single path in FIG. 2 to avoid overcomplicating the drawing. In addition, there may be more than one of each of media content source 216 and media guidance data source 218, but only one of each is shown in FIG. 2 to avoid overcomplicating the drawing. (The different types of each of these sources are discussed below.) If desired, media content source 216 and media guidance data source 218 may be integrated as one source device. Although communications between sources 216 and 218 with user equipment devices 202, 204, and 206 are shown as through communications network 214, in some embodiments, sources 216 and 218 may communicate directly with user equipment devices 202, 204, and 206 via communication paths (not shown) such as those described above in connection with paths 208, 210, and 212.

Media content source 216 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 216 may be the originator of media content (e.g., a television broadcaster, a Webcast provider, etc.) or may not be the originator of media content (e.g., an on-demand media content provider, an Internet provider of video content of broadcast programs for downloading, etc.). Media content source 216 may include cable sources, satellite providers, on-demand providers, Internet providers, or other providers of media content. Media content source 216 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 218 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 218 may be provided to users' equipment using a client-server approach. For example, a guidance application client residing on the user's equipment may initiate sessions with source 218 to obtain guidance data when needed. Media guidance data source 218 may provide user equipment devices 202, 204, and 206 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 104 of user equipment device 100 and partially on a remote server as a server application (e.g., media guidance data source 218). The guidance application displays may be generated by the media guidance data source 218 and transmitted to the user equipment devices. The media guidance data source 218 may also transmit data for storage on the user equipment, which then generates the guidance application displays based on instructions processed by control circuitry.

Media guidance system 200 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 2.

In one approach, user equipment devices may communicate with each other within a home network. User equipment devices can communicate with each other directly via short-range point-to-point communication schemes describe above, via indirect paths through a hub or other similar device provided on a home network, or via communications network 214. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 216 to access media content. Specifically, within a home, users of user television equipment 204 and user computer equipment 206 may access the media guidance application to navigate among and locate desirable media content. Users may also access the media guidance application outside of the home using wireless user communications devices 206 to navigate among and locate desirable media content.

It will be appreciated that while the discussion of media content has focused on video content, the principles of media guidance can be applied to other types of media content, such as music, images, etc.

Figure 3:
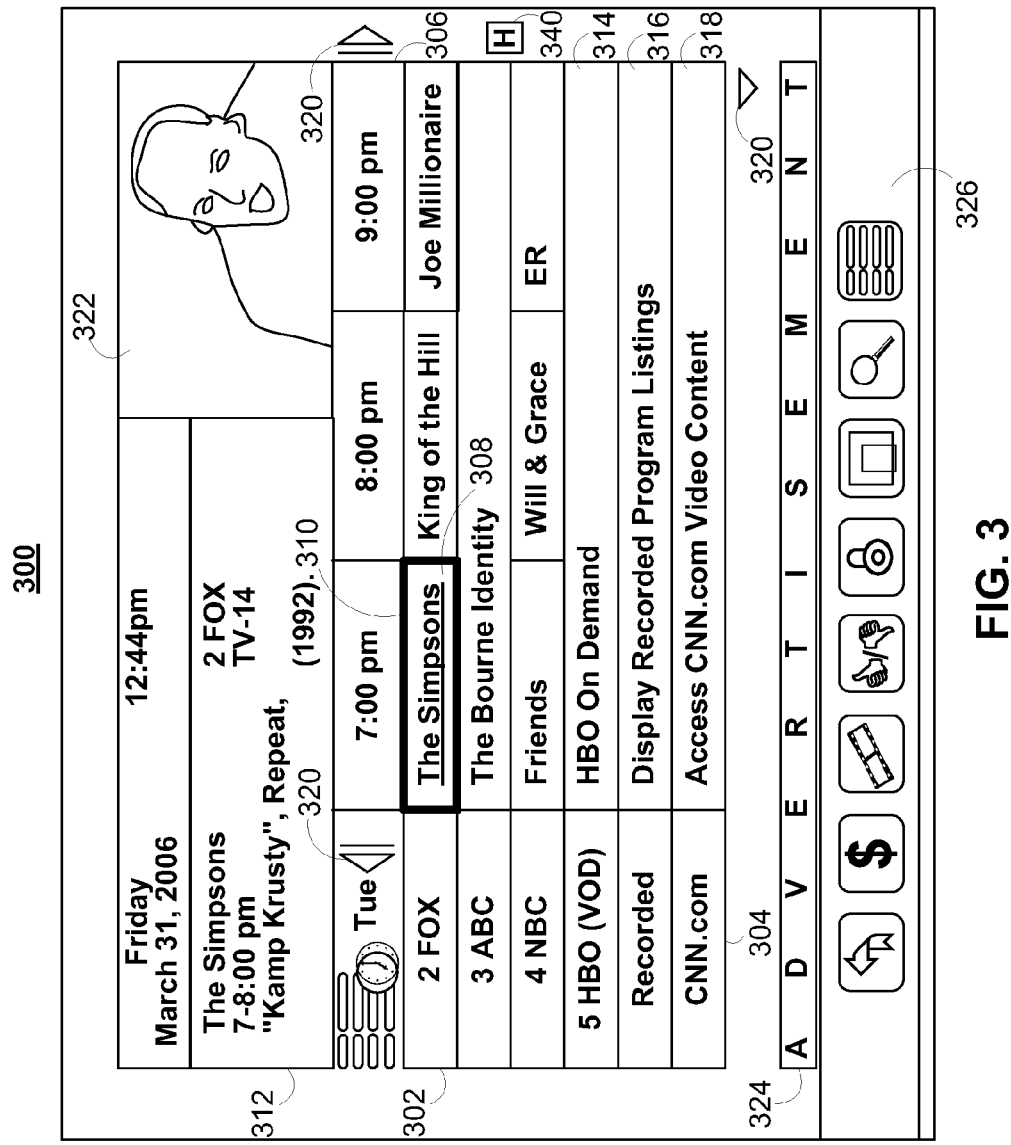
FIG. 3 shows an illustrative media guidance display screen in accordance with some embodiments of the present invention.
Figure 4:
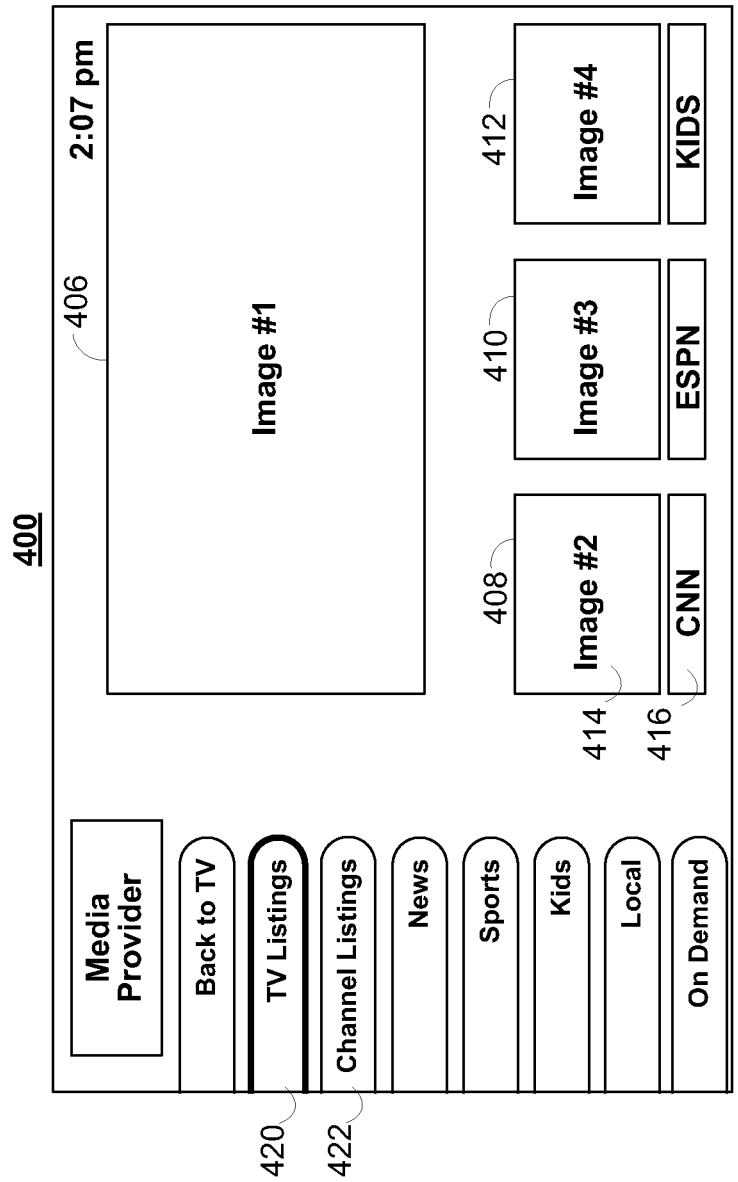
FIG. 4 shows another illustrative media guidance display screen in accordance with some embodiments of the present invention.

One of the functions of the media guidance application is to provide media listings and media information to users. FIGS. 3-4 show illustrative display screens that may be used to provide media guidance, and in particular media listings. The display screens shown in FIGS. 3-4 may be implemented on any suitable device or platform. While the displays of FIGS. 3-4 and are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 3 shows illustrative grid program listings display 300 arranged by time and channel that also enables access to different types of media content in a single display. Display 300 may include grid 302 with: (1) a column of channel/media type identifiers 304, where each channel/media type identifier (which is a cell in the column) identifies a different channel or media type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 302 may provide listings for non-linear programming including on-demand listing 314, recorded media listing 316, and Internet content listing 318. A display combining listings for content from different types of media sources is sometimes referred to as a "mixed-media" display. The various permutations of the types of listings that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In other embodiments, listings for these media types may be included directly in grid 302. Additional listings may be displayed in response to the user selecting one of the navigational icons 320. (Pressing an arrow key on a user input device may affect the display in a similar manner as selecting navigational icons 320.)

Display 300 may also include video region 322, advertisement 324, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 324 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 302. Advertisement 324 may also be for products or services related or unrelated to the media content displayed in grid 302. Advertisement 324 may be selectable and provide further information about media content, provide information about a product or a service, enable purchasing of media content, a product, or a service, provide media content relating to the advertisement, etc. Advertisement 324 may be targeted based on a user's profile/preferences, monitored user activity, the type of display provided, or on other suitable targeted advertisement bases.

While advertisement 324 is shown as rectangular or banner shaped, advertisements may be provided in any suitable size, shape, and location in a guidance application display. For example, advertisement 324 may be provided as a rectangular shape that is horizontally adjacent to grid 302. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 326 may allow the user to access different types of media content, media guidance application displays, and/or media guidance application features. Options region 326 may be part of display 300 (and other display screens of the present invention), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 4. Video mosaic display 400 includes selectable options 402 for media content information organized based on media type, genre, and/or other organization criteria. In display 400, television listings option 404 is selected, thus providing listings 406, 408, 410, and 412 as broadcast program listings. Unlike the listings from FIG. 3, the listings in display 400 are not limited to simple text (e.g., the program title) and icons to describe media. Rather, in display 400 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 408 may include more than one portion, including media portion 414 and text portion 416. Media portion 414 and/or text portion 416 may be selectable to view video in full-screen or to view program listings related to the video displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 5:
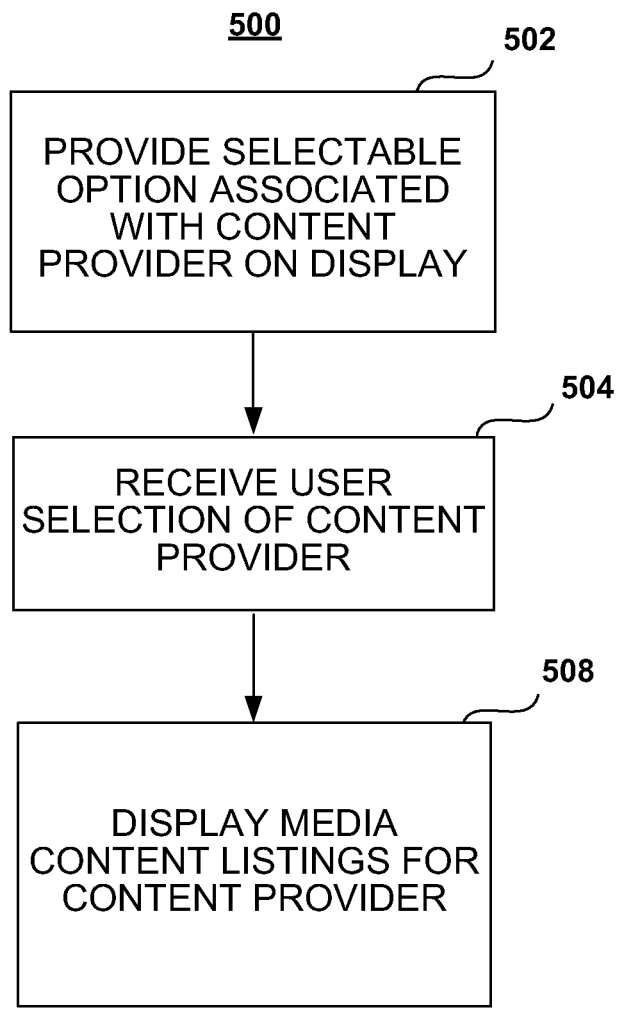
FIG. 5 is a flow chart of illustrative steps involved in display media content listings in accordance with some embodiments of the present invention.

In some embodiments of the present invention, the media guidance application may provide the user with the ability to display media content listings associated with a particular media content provider. FIG. 5 shows a flowchart 500 of illustrative steps for providing a display of media content listings associated with one or more media content provider(s). At step 502, a selectable option may be provided on the display screen the selection of which will cause media content listings to be displayed that are associated only with one or more particular content providers. At step 504, a user selection of the selectable option is received from, for example, user input interface 110. The selectable option may be manifested in a variety of ways, including, for example, a grid of selectable cells in which each cell, of a particular column, for example, is associated with a particular media content provider, or a pop-up display window containing selectable links associated with particular media content providers. The selectable option may also be manifested as one or more selectable links embedded in a web page, in which each link is associated with one or more media content providers. In response to the user selection, the media guidance application may display the media content listings in step 508.

Step 508 may include providing additional user selectable options in some embodiments. These additional options may include options for selecting a media content listing for detailed information display, arranging media content listings by sorting criteria such as chronologically by year produced or scheduled date/time of broadcast, by genre, by rating, or alphabetically by title, actor, producer, or director. Composite sorting, or nesting according to more than one sorting criteria, may also be employed to ease navigation by the user. For example, listings may be grouped by genre, and displayed in alphabetical order by title within each particular genre with the genre groupings sequentially displayed. Any combination of sorting criteria is suitable for composite sorting. FIGS. 6-9 show exemplary embodiments of the general process illustrated in FIG. 5. The display screens shown in FIGS. 6-9 may be implemented on any suitable device or platform, and although they are illustrated as full screen displays, they may also be fully or partially overlaid over media content being displayed.

Figure 6:
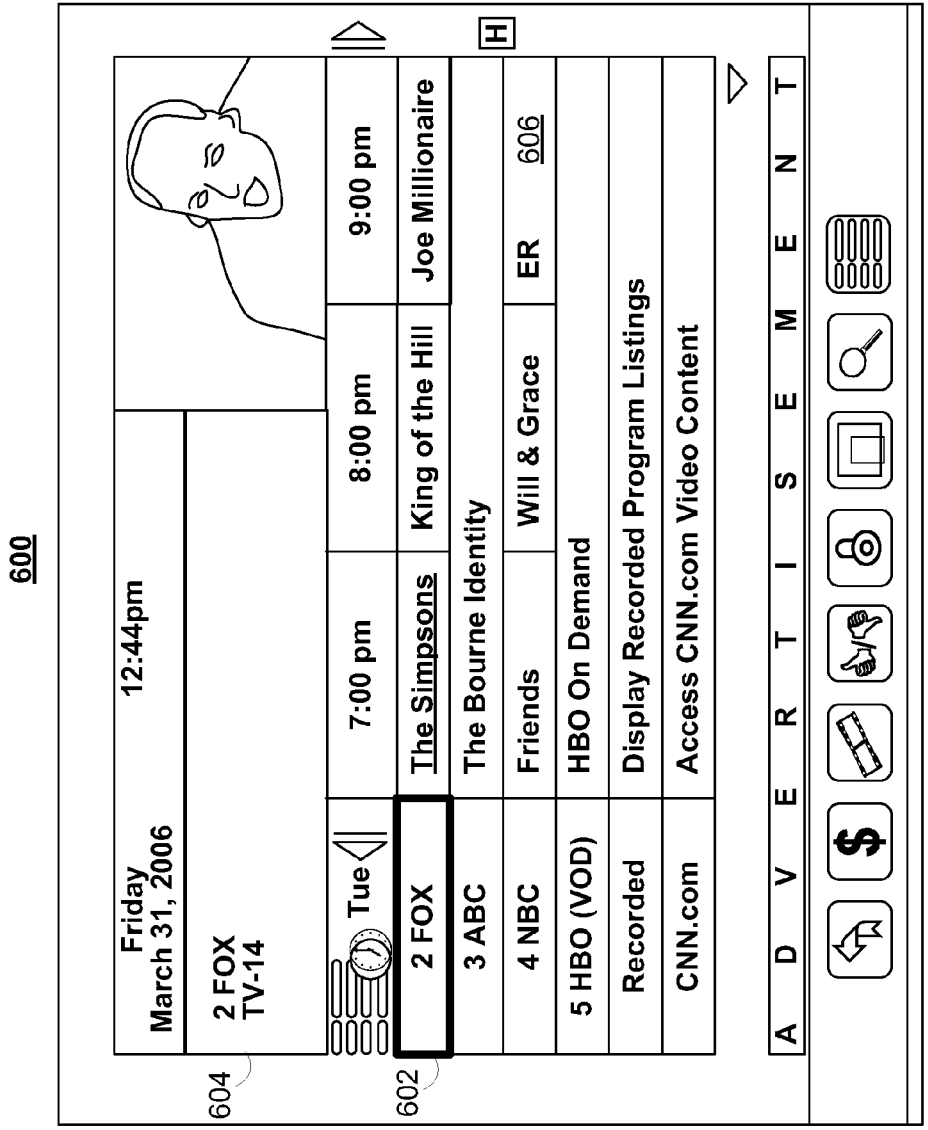
FIG. 6 shows another illustrative media guidance display screen in accordance with some embodiments of the present invention.

In some embodiments, user selection of a selectable may be achieved by providing a selectable cell associated with a content provider in the program listings as, for example, illustrated in FIG. 6. Using a user input interface, the user may be given the ability to position a moving highlight region to cell 602, associated with media content provider FOX in this example, in the program listings. Upon highlighting cell 602, detailed content provider information may be displayed in the content provider information region 604. In some embodiments, one or more cells, associated with, for example, different content providers, may be simultaneously highlighted by the user using the user input interface. It will be understood that any other suitable selection techniques may be made available to the user either in place of or in addition to a navigable highlight. For example, a pointer may be moved around the display screen using, for example, a hand held pointing device held by the user. In one suitable approach, the user input interface may be in the form of a touch sensitive screen that the user may manipulate by touching different areas of the screen to effectuate the selection of an on-screen option. In another suitable approach, the user input interface may be in the form of selectable links embedded in a web page that may be selected by either a moving highlight or hand held pointing device held by the user. Any such suitable selection techniques may be employed in the context of the present invention. For purposes of brevity and clarity, and without limitation, the present invention will be described with reference to the use of navigable highlights.

Figure 7:
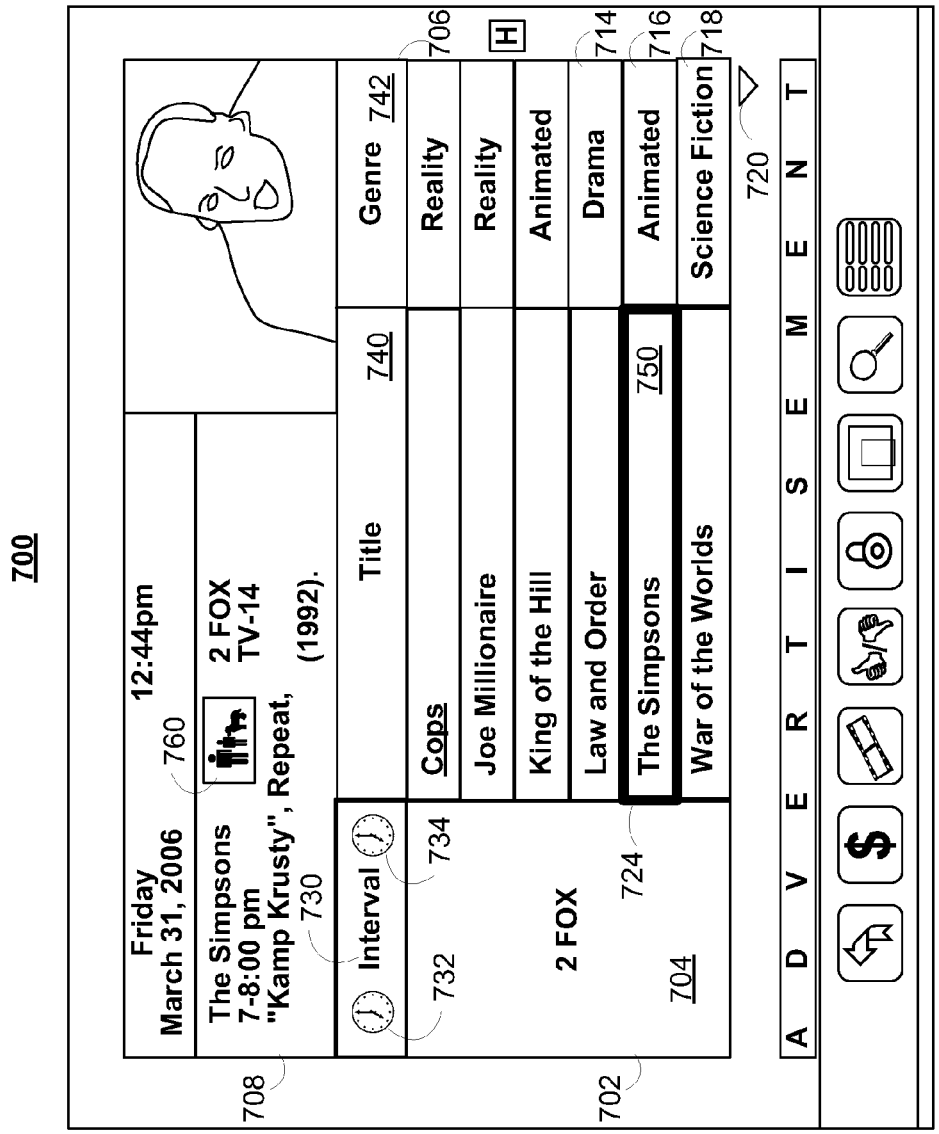
FIG. 7 shows another illustrative media guidance display screen in accordance with some embodiments of the present invention.

In an exemplary embodiment, the media guidance application may display screen 700, shown in FIG. 7, in response to a user selection, using the user input interface. The media guidance application may display screen 700 in response to a user selection of highlighted cell 602 as shown in FIG. 6. In another embodiment, the media guidance application may allow the user to highlight and select a displayed content listing, and in view content listings associated with the content provider associated with any cell (i.e. cell 606 in FIG. 6) highlighted by the user. Display screen 700 includes a program listing grid 702 having a listing of media content scheduled to be displayed by selected content provider (e.g., the FOX channel as shown by cell 704 in FIG. 7). In this exemplary embodiment, media content listings are arranged in a vertical column. Any suitable arrangement of media content listings may be displayed including arrangements in a horizontal row, a two dimensional grid, geometric pattern, non-geometric pattern, or any other arrangement of listings or any combination of arrangements of listings.

In some embodiments, the media guidance application may provide one or more selectable options on display screen 600 (shown in FIG. 6) that allow the user, using the user input interface, to select more than one media content provider such that listings associated with the more than one content providers are displayed by the media guidance application. In this embodiment, any grouping or subset of content providers may be selected. This embodiment provides greater flexibility to the user, in navigating amongst media content listings.

Media content is arranged alphabetically by title in grid 702, with the associated genre also displayed horizontally adjacent to the each title cell as shown representatively by cells 714, 716, and 718. Navigational icon 720 may be made available to the user to allow the user, using the user input interface, to view additional media content listings. While navigation icon 720 is selected, title bar 706 (including cells 730, 740, and 742) remains visible and unmoved as listings are navigated. Any other suitable navigation technique may be made available to the user either in place of or in addition to the selectable navigable icon.

The media guidance application may provide detailed listing information region 708 in response to the user moving highlight region 724 to any media content listings (i.e. cell 750 in FIG. 7) in the media content listings display. The media guidance application may also display detailed listing information for listings in a pop-up window overlay, in the title cell of a listing, in a separate "Information" column, or some other region on the display. Detailed listing information may include listing title, sponsor, schedule information, date information corresponding to broadcast, time information corresponding to broadcast, date information corresponding to production date, name(s) of associated personnel (actors, actresses, directors, producers and other involved personnel), episode title, rating, genre, content description, episode description, and any other information related to the highlighted listing. Detailed listing information may also include graphical information such as a still screenshot image (as shown illustratively by image 760 in FIG. 7), promotional image, trademark, logo, icon or other graphic indicator associated with the respective content, to aide navigation of the content listings. The media guidance application may display any combination of detailed information as detailed listing information. The media guidance application may also display genre information in region 708 in response to the user moving the highlight region to a cell displaying genre type (for example, cells 714, 716, and 718 shown in FIG. 7). Detailed genre information may include a description or definition of the genre type, and relevant references to exemplary program titles representative of the genre.

In this exemplary embodiment, the media guidance application provides highlight region 724 that the user may move on the display, using the user input interface, to highlight and select either "Title" cell 740 or "Genre" cell 742 in title bar 706. In response to user selection of either "Title" cell 740 or "Genre" cell 742, the media guidance application arranges the display of listings alphabetically by title, or by genre, respectively. In response to a redundant selection of a heading icon such as icon 740 or 72, the media guidance application may result in reverse sorting under the same sorting criteria. For example, if listing are arranged in alphabetical order by title, a user selection of the "Title" icon 740 may rearrange the title listings in reverse alphabetical order. Similarly, if listing are arranged in reverse alphabetical order by title, a user selection of the "Title" icon 740 may rearrange the title listings in forward alphabetical order. It will be understood that any other suitable sorting criteria may be used in the media guidance application display of content listings in place of, or in addition to, title and genre. Additional sorting criteria may include sorting listings chronologically by year produced or scheduled date of broadcasting, by genre, by rating, or alphabetically by title, actor, producer, or director. Additional sorting criteria include user-selected groupings containing one or more media content listings. Composite sorting amongst one or more sorting criteria may also be employed to ease navigation by the user. For example, the media guidance application may include the sorting criteria "title" and "day", referring to the title of the media content listing and the date that the media content listing is scheduled to be broadcast, respectively. In this example, the media guidance application may display media content listings arranged in alphabetical order by title, or in chronological sort by the date a listing is scheduled to be broadcast. The media guidance application may also employ composite sorting. For example, listings may be sorted by "day" and displayed in alphabetical order by title within each grouping of "day", with the groupings of "day" displayed in sorted sequence. Any sorting criteria, or any combination of sorting criteria, may be employed in the context of the present invention. The media guidance application may provide the user with a selectable option for rearranging columns, i.e. the columnar lists contained in grid 702 may be arranged amongst themselves in any order. The selectable option for rearranging columns may include a drag and drop option, point and click option, or any other user selectable option.

The media guidance application may also provide on the display a selectable time interval option that may be selected by the user, using the user input interface. Upon receiving a user selection of the time interval option, the media guidance application displays media content listings associated with content that is scheduled to be broadcast during the selected time interval according to the program listings guide. This feature allows the user to define a time interval, and view media content listings scheduled to be displayed during the defined time interval. The illustrative "Interval" cell (cell 730 in FIG. 7) may contain selectable icons 732 and 734 that may be selected by the user, using the user input interface, to specify the beginning and end time of the time interval, respectively. In this embodiment, user selection of icon 732 or icon 734 may initiate the display of a pop-up window, or other visual application, containing a calendar or clock, or any combination of calendar and clock, with selectable dates, times or any combination of dates and times. It will be understood that any other suitable selectable option may be made available to the user to select the interval beginning and end times, either in place of or in addition to the pop-up option. For example, a new display screen may be displayed, either fully or partially overlaid over the current display screen, including selectable cells corresponding to particular time intervals, times, dates or any combination thereof. In another suitable approach, the selectable time interval option may be in the form of a pop-up window containing a text box, in which the media guidance application allows the user to enter text corresponding to a time interval, time, date or any combination thereof. In another suitable approach, the selectable time interval option is in the form of one or more pull-down menu containing selectable time intervals, times, dates, or any combination thereof. In a further suitable approach, beginning and end time selectable icons 732 and 734 may be displayed as a single icon. In response to the receiving a user selection of this single icon, the media guidance application may display any type of time selection option. One skilled in the art will appreciate that various permutations of the time interval selection process are available and within the scope of the present invention.

The time interval may be contiguous, such as the twenty-six hour time interval from 6:00 pm Tuesday to 8:00 pm Wednesday, or may include non-contiguous options, such as the two hour interval from 6:00 pm to 8:00 pm on each day Monday through Friday. If no time interval is selected, then media content associated with listings scheduled for the selected content provider is displayed for a predetermined, default time interval that is at least one half hour long.

The media guidance application may also provide the display of media content listings with duplicate listings removed. Duplicate listings may arise in the case that a program title, or a particular episode of a program series, is scheduled to be broadcast more than once during the selected time interval. Each title cell below cell 740 in FIG. 7 appears only once in the exemplary display. For example, if the TV program "The Simpsons" is scheduled to be broadcast on the selected content provider more than one time during the selected time interval, the media guidance application may remove the redundant listings from the media content display. In this way the user is presented with a reduced number of listings amongst which to navigate. In addition to removing duplicates by program title, the media guidance application may also remove duplicates based on episode from the display, while displaying listings for different episodes of the same program title. For example if the episode titled "Kamp Krusty" of the program "The Simpsons" is scheduled to be broadcast on the selected content provider more than one time during the selected time interval, the media guidance may remove duplicate listings of this episode from the display, but not remove listings of other episodes, with different episode titles, of the "The Simpsons". The media guidance application may also provide a selectable option to the user, in which the user can select whether duplicate listings are allowed to be displayed, and whether duplicates will be removed by episode or by program title. It will be understood that both "removing" a media content listing from the display, and "excluding" (or "preventing") the display of a duplicate media content listing shall be within the scope of the present invention.

Figure 8:
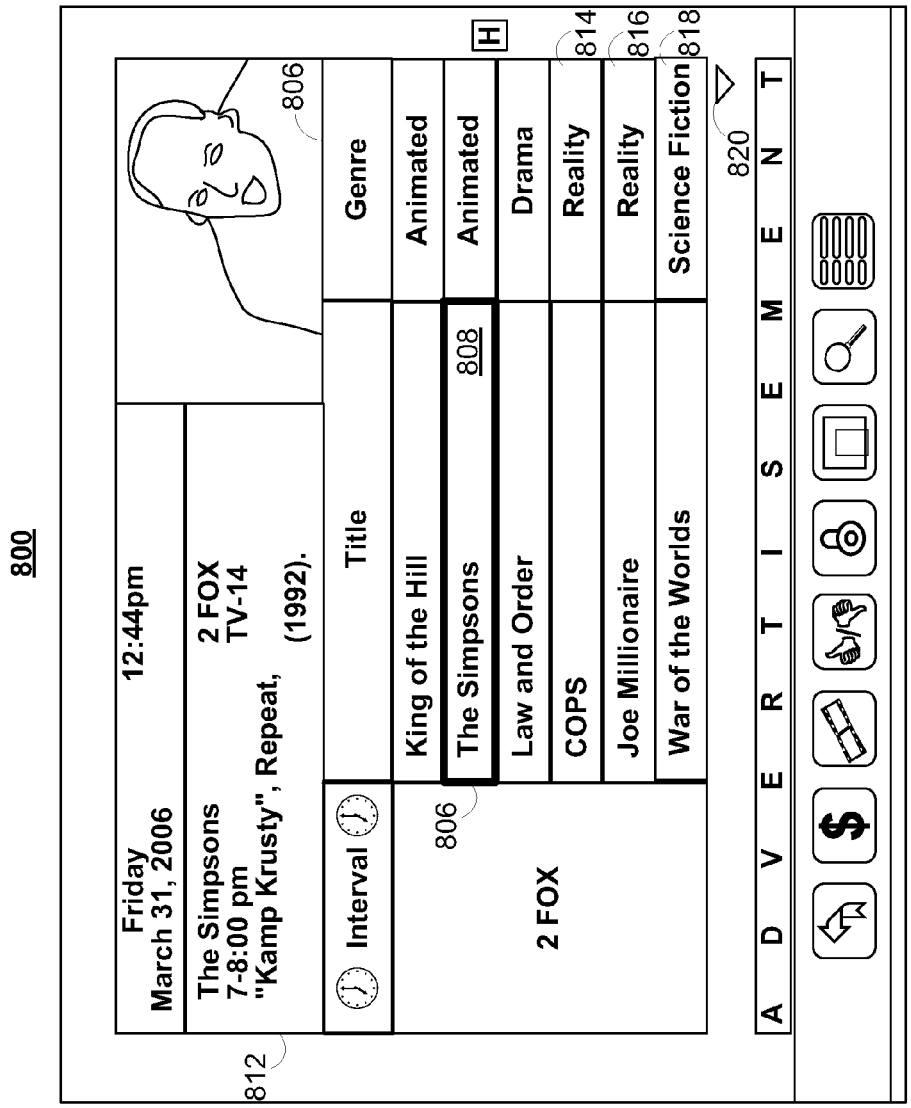
FIG. 8 shows another illustrative media guidance display screen in accordance with some embodiments of the present invention.

In response to receiving a user selection of selectable cell 742 title "Genre" shown in FIG. 7, the media guidance application may display media content listing display screen 800, as shown in FIG. 8, including media content listings displayed in order of genre as shown in column 806. As shown by exemplary grid rows 814 and 816, listings may be grouped by genre and further arranged alphabetically within each genre, as shown by exemplary grid rows 814, 816, and 818. As shown by exemplary column 806, the various genre groupings may also be listed in alphabetical order. Any composite sorting of listings may be used in the media guidance application display of media content listings. User selection of navigation icon 820 may direct the media guidance application to display additional content listings.

The media guidance application may provide detailed listing information 812 in response to the user moving highlight region 806 to any media content listings (e.g., cell 808 in FIG. 8) in the media content listings display. Detailed information may include program title, schedule information, date information corresponding to broadcast, time information corresponding to broadcast, date information corresponding to production date, name(s) of associated personnel (actors, actresses, directors, producers and other involved personnel), episode title, rating, genre, program description, episode description, and any other information related to the highlighted listing.

Figure 9:
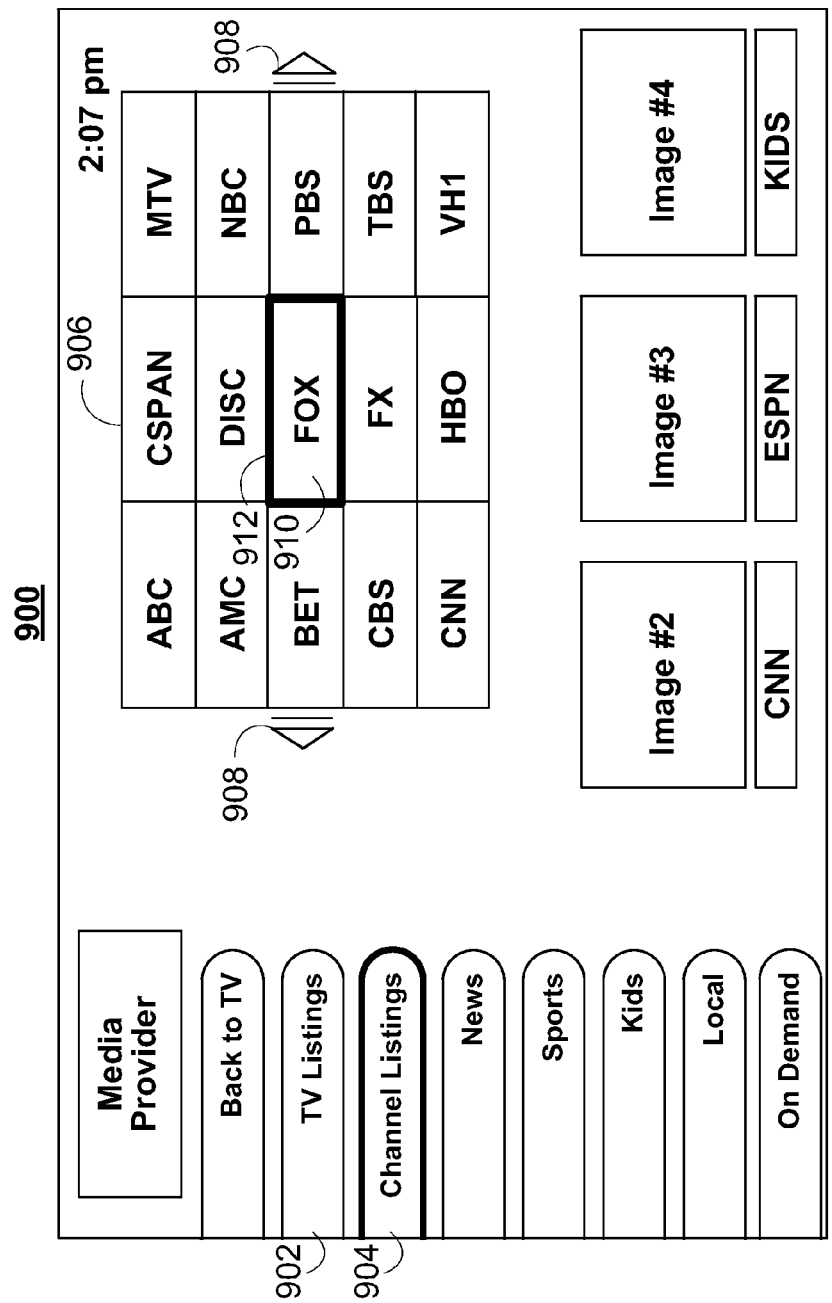
FIG. 9 shows another illustrative media guidance display screen with selectable options in accordance with some embodiments of the present invention.

In some embodiments, the media guidance application may provide a user-selectable option corresponding to a content provider, as included in display screen 900 in FIG. 9. The media guidance application provides selectable cell 904, titled "Channel Listings", which can be selected by the user, using the user input interface, to direct the media guidance application to display a listing of content providers 906. The "Channel Listings" selectable option may also be provided on the display screen as a sub-menu or sub-option of the "TV Listings" selectable option 902, in which in response to a user selection of the "TV Listings" cell, an option is provided to the user to continue to the program guide listings (such as FIG. 3 or 6) or the media content listings display screens (such as FIG. 7 or 8). The media guidance application may display content provider listings including selectable cells associated with one or more content providers.

The media guidance application may display media content listings as shown in FIGS. 7-8 in response to a user selection, using the user input interface, of a selectable cell associated with a content provider in grid 906. The media guidance application may also display grid 906 as a full or partial overlay screen, a pop-up window, or a new display screen. In an additional embodiment, the media guidance application may display selectable embedded links in a web page, in which each link is associated with one or more content providers. The media guidance application may display a new web page containing media content listings in response to a user selection, using the user input interface, of one or more selectable links associated with a content provider.

It will be understood that the foregoing is only illustrative of the principles of the invention, and that various modifications may be made by those skilled in the art without departing from the scope and spirit of the invention. It will also be understood that various display, selection and sorting techniques may be made available to the user and examples used herein are only for convenience. Those skilled in the art will appreciate that the invention may be practiced by other than the described embodiments, which are presented for purposes of illustration rather than of limitation, and the invention is limited only by the claims that follow.

What is claimed is:

1. A method for providing media content listings, the method comprising:
   generating a first program grid, on a display device, comprising a first plurality of media content listings associated with a plurality of content providers, wherein a first axis of the first program grid defines the plurality of content providers and includes a selectable option associated with a first content provider, and wherein a second axis of the first program grid defines a first criteria;
   electronically receiving an indication of a user selection of the selectable option; and
   in response to the indication, generating a second program grid on the display device, wherein a first axis of the second program grid defines only the first content provider, and wherein the second program grid comprises a second plurality of media content listings associated with only the first content provider ordered along the first axis of the second program grid, and wherein a second axis of the second program grid defines a second criteria, wherein time schedule information associated with the second plurality of media content listings is not displayed.

2. The method of claim 1 wherein generating a second program grid comprises generating the second plurality of media content listings without duplicates.

3. The method of claim 2 wherein generating the second plurality of media content listings without duplicates comprises generating the second plurality of media content listings without displaying duplicate content titles that correspond to different scheduled broadcast times of a particular content.

4. The method of claim 2 wherein generating the second plurality of media content listings without duplicates comprises generating the second plurality of media content listings without displaying content titles that correspond to the same episode of a series having different scheduled broadcast times.

5. The method of claim 1 wherein the first criteria of the second axis of the first program grid is associated with a broadcast time range.

6. The method of claim 1 wherein the first axis of the second program grid is associated with title information.

7. The method of claim 1 wherein at least one of the second plurality of media content listings is associated with scheduled broadcast video programming.

8. The method of claim 1 wherein at least one of the second plurality of media content listings is associated with scheduled broadcast audio programming.

9. The method of claim 1 wherein the second program grid comprises the second plurality of media content listings ordered alphabetically according to title.

10. The method of claim 1 wherein the second criteria associated with the second axis of the second program grid is genre.

11. The method of claim 1 wherein at least one of the second plurality of media content listings is selectable, the method further comprising generating additional information associated with a selected media content listing.

12. The method of claim 11 wherein the additional information comprises graphical information.

13. A system for providing media content listings comprising:
- a user input device;
- a display device; and
- processing circuitry configured for:
  - generating a first program grid, on a display device, comprising a first plurality of content media listings associated with a plurality of content providers, wherein a first axis of the first program grid defines the plurality of content providers and includes a selectable option associated with a first content provider, and wherein a second axis of the first program grid defines a first criteria;
  - electronically receiving an indication of a user selection of the selectable option; and
  - in response to the indication, generating a second program grid on the display device, wherein a first axis of the second program grid defines only the first content provider, and wherein the second program grid comprises a second plurality of media content listings associated with the first content provider ordered along the first axis of the second program grid, and wherein a second axis of the second program grid defines a second criteria, wherein time schedule information associated with the second plurality of media content listings is not displayed.

14. The system of claim 13 wherein generating a second program grid comprises generating the second plurality of media content listings without duplicates.

15. The system of claim 14 wherein generating the second plurality of media content listings without duplicates comprises generating the second plurality of media content listings without displaying duplicate content titles that correspond to different scheduled broadcast times of a particular content.

16. The system of claim 14 wherein generating the second plurality of media content listings without duplicates comprises generating the second plurality of media content listings without displaying content titles that correspond to the same episode of a series having different scheduled broadcast times.

17. The system of claim 13 wherein the first criteria of the second axis of the first program grid is associated with a broadcast time range.

18. The system of claim 13 wherein the first axis of the second program grid is associated with title information.

19. The system of claim 13 wherein at least one of the second plurality of media content listings is associated with scheduled broadcast video programming.

20. The system of claim 13 wherein at least one of the second plurality of media content listings is associated with scheduled broadcast audio programming.

21. The system of claim 13 wherein the second program grid comprises the second plurality of media content listings ordered alphabetically according to title.

22. The system of claim 13 wherein the second criteria associated with the second axis of the second program grid is genre.

23. The system of claim 13 wherein at least one of the second plurality of media content listings is selectable, the system further comprising further comprising generating additional information associated with a selected media content listing.

24. The system of claim 23 wherein the additional information comprises graphical information.

* * * * *